Oct. 13, 1959     T. F. PETERSON     2,908,741
ELECTRIC CABLE WITH PRESSURE COMPENSATING MEANS
Filed Nov. 22, 1955     2 Sheets-Sheet 1

INVENTOR.
THOMAS F. PETERSON
BY Richard H. MacCutcheon
ATTORNEY

Oct. 13, 1959     T. F. PETERSON     2,908,741
ELECTRIC CABLE WITH PRESSURE COMPENSATING MEANS
Filed Nov. 22, 1955     2 Sheets-Sheet 2
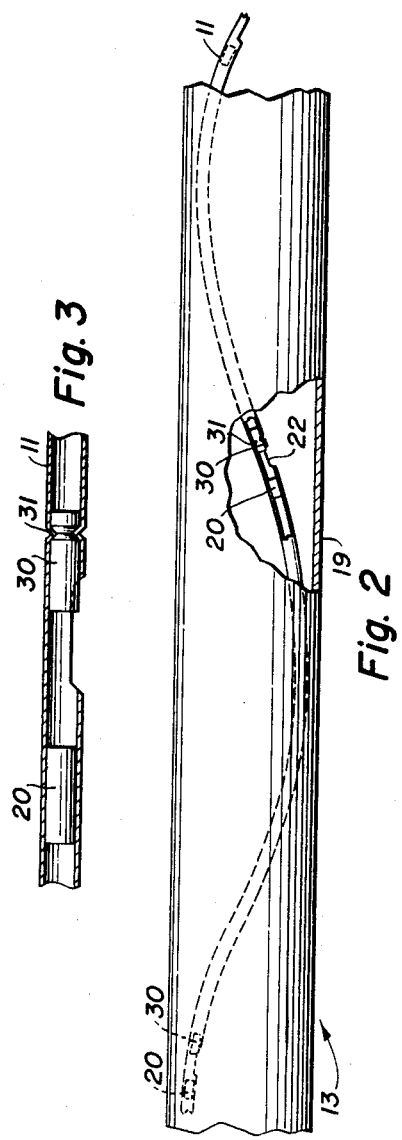
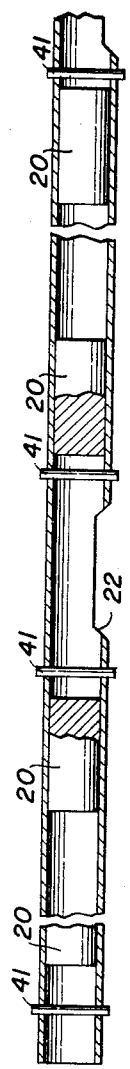
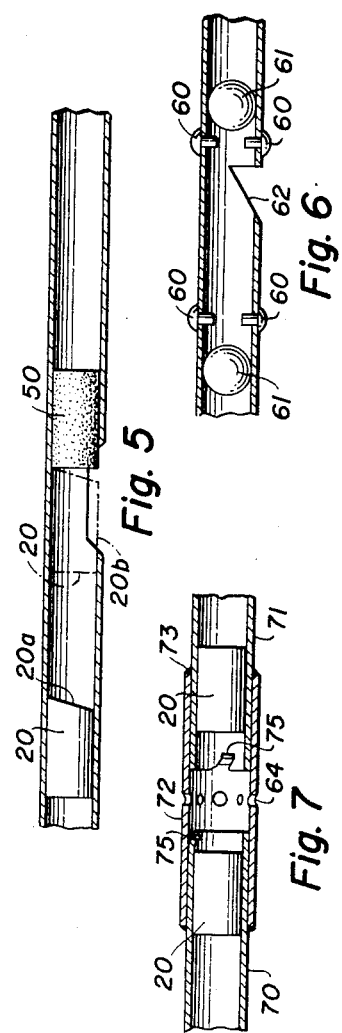
INVENTOR.
THOMAS F. PETERSON
BY Richard H. MacCutcheon
ATTORNEY

United States Patent Office 2,908,741
Patented Oct. 13, 1959

2,908,741

ELECTRIC CABLE WITH PRESSURE COMPENSATING MEANS

Thomas F. Peterson, Shaker Heights, Ohio

Application November 22, 1955, Serial No. 548,510

5 Claims. (Cl. 174—13)

This invention relates to improvements in electric cable and more particularly to so-called pressure compensated cable as disclosed in U.S. Patents: 1,939,875 to Bush; 1,956,199 to Peterson; 2,138,362 to Thompson; and 2,316,808 to Peterson.

Electric cable, in general, comprises one or more conductors, insulation and an impervious outer sheathing as of lead. In the manufacture of high voltage power cable, and often in the manufacture of other type cable such as certain kinds of control and telephone cable, it is conventional to make up a core assembly of one or more conductors covered with paper and/or other dry insulation material spacers and fillers, then this assembly is placed in a tank where it is subjected to heat and high vacuum to remove moisture and air. When the drying and evacuation cycles are complete, oil or gas or insulating compounds, usually at elevated temperatures, are introduced to thoroughly saturate the dry insulation. Following this the sheath is applied, around the entire cable core and around its ends to seal in the fluid.

As explained in the above mentioned patents, in the operation of electric cable there are temperature rises which result in various types of "differential expansion." For example, an oil impregnant may expand faster than conductor or sheathing and this may subject the sheathing to undue pressures causing stretching if the stresses are beyond elastic limit of the sheath. On the next cycle a vacuum may be created and this may have important effects on dielectric characteristic, and during normal heating cycles the sheath may become loose and various problems may result from migration of impregnating fluid.

As shown in my above mentioned Patent 1,956,199, in 1928 I proposed spaced expansible devices of metal, etc., located within a hollow conductor placed within the core assembly for the purpose of pressure-compensating, and as indicated in 2,316,808 in 1939 I proposed anticline configurations of tubing to provide spaced gas reservoirs for trapping a pressure-compensating gas while permitting contact with usual insulation impregnating oil in limbs of the reservoir. Thompson in 2,138,362 meanwhile proposed relatively short capillary "level" tube lengths with a liquid entrapping a gas cushion in each such tube length, with or without piston-like or sphere shaped "slides" interposed to decrease the area of contact at what would otherwise be the gas to oil interface.

These proposals have limited application, and it has now developed that none of them adequately meet all the problems. Spaced expansible devices in a tube are difficult to construct and to maintain, being subject to fatigue and eventual disruption; intended anticline configurations and intended "level" lengths are not always reliable (particularly since the manufacturer can never be sure at what inclination the cable may finally be installed) and have additional disadvantages of providing gas to oil interfaces which afford danger areas due to tendency of gas thereat to disappear into the oil where it interferes with dielectric properties of the insulation; and whenever slides according to any of the prior teachings have been tried it is found that for the most part they "blow-out" during the evacuation cycle (during assembly and prior to impregnation) resulting in structures difficult and expensive to fabricate unless the occluded gas pressures are so low that the cable can never be operated at pressures above atmospheric, though operation at higher pressures is usually desirable to raise permissible operating voltage.

It is an object of the present invention to provide simple means for overcoming the above mentioned difficulties.

Another object of the invention is to provide gas pressure compensated insulated cable structure able to operate at super atmospheric pressures and at elevated operating temperatures while having adequate protection against damage due to differential expansion or due to formation of gas pockets or voids within the insulation portion of the structure.

Another object of the invention is to provide improved cushioned cable capable of being fabricated by simple and inexpensive methods and processes.

Another object is to provide adequate pressure compensated cable which can be stored in any position (as on a reel) and installed in any position up a hill or down a pole and without regard for reversal end for end.

According to one form of the present invention, I provide somewhere within the cable core structure one or more tubes, preferably though not necessarily continuous from end to end of the cable. If mechanically continuous then each such tube is not continuous as to pressure transmission for any great length of cable. Small impermeable slugs are provided at intervals where there are ports for making contact between the liquid of the cable and the inside of the tubing and suitable means are provided for stopping travel of the slugs and to prevent blowout of slugs or gas thereabout during evacuation. The stop means, as hereafter described in detail, may take the form of crimps in the tube, or pins, or crimps, pins or glue holding additional non-sliding slugs to limit travel of sliding slugs, or there may be other sorts of stops, but in any event some means must be provided for introducing the slugs in the first place and then preventing their later blowout or fallout or leakage between slugs and tube bore, all to the end of assuring a cable in which the pressure may be stabilized above atmospheric to allow development of the maximum possibilities of the dielectric properties of pressurized impregnated insulation without development of excessive cycles of pressure variation within the cable structure.

Other objects and advantages will become apparent and the invention may be better understood from consideration of the following description taken in connection with the accompanying drawing, in which:

Fig. 2 is a partial assembly in longitudinal elevation and partly broken away to show the placement and arrangement of pressure compensating parts in cable constructed as in Fig. 1;

Fig. 3 is an enlargement of a portion of straight tubing before helical winding to the position shown in Fig. 2;

Figs. 4, 5, 6 and 7 illustrate modifications.

Figure 1:
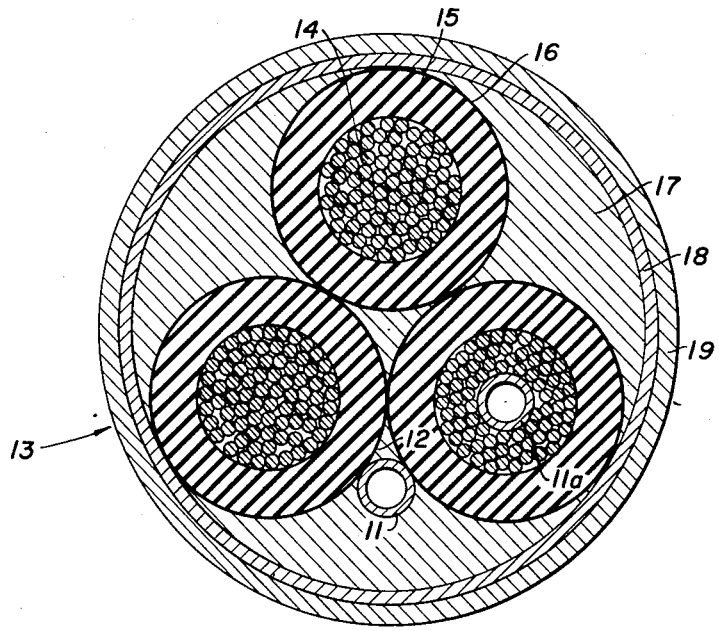
Fig. 1 is a cross-sectional view of one form of cable made in accordance with the invention.

In general the invention applies to any single or multiple conductor cable of the pressurized fluid filled type. For pressure compensating under all operating conditions the embodiment illustrated in Figs. 1–2 consists of at least one continuous tube 11 laid helically along the length of a valley 12 of a three conductor cable 13. In multi-conductor cable such valleys are usually helical though with the present invention this is not necessary and a tubing 11 could be laid horizontally within the sheathing of either multiple conductor or single conductor cable.

The cable 13 is assumed to have each conductor 14 insulated with oil impregnated wrappings of fibrous material 15 such as paper. Often it is desirable to include "shielding" about the individual conductor insulation, and such shielding 16 may be provided in the form of metal tapes or semi-conducting layers as disclosed in my Patents 2,322,702 and 2,446,387. If the shields are semi-conducting, then wire braid or metal tapes or drain wires or sufficient metallic tubes 11 to serve as such may be provided to equalize voltages and prevent disturbances or excessive stresses on the insulation by periodically grounding the semi-conducting shields. The valleys between the insulated conductors may all be filled with jute 17 (except for any space occupied by drain wires or tubes). A permeable tape or braid 18 can be used to hold the above described "core" construction together during evacuation and impregnation cycles already referred to and after which the core is enclosed by an impermeable outer sheath 19 which may be of lead, or aluminum, or substitute organic materials.

Various alternative constructions can be used, of course, and if desired one or more pressure compensating tubes can be located entirely within the strands of one conductor as indicated at 11a in Fig. 1.

As assumed in Fig. 2, the configuration of the tube 11 may be helical in order to fit into the helical valley 12 between helical conductors 14. If such tube is to act as a "drain wire" it is preferably made of a conducting metal such as copper, otherwise it may be made of plastic or any inert impervious material. As previously stated the tube is not continuous for pressure transmission by any great length of cable and while the closeness of discontinuities is somewhat exaggerated in the diagrammatic representation of Fig. 2 such discontinuities may be at 30 ft. or 60 ft. intervals (in any event in a section of cable 500 ft. long there would be several of them), or instead of discontinuities in a single tube there may be arranged end-for-end a series of tubes, each filled with gas. Each tube in such a series, or each tube length between discontinuities, as hereafter explained, is filled with gas and has closely fitting within its bore a movable impermeable slug or plug 20 adjacent intervals where there are ports 22 for making contact between the fluid of the cable and the interior of the tubing. It is intended that the slugs 20 be freely slidable (up to the stops) within the tube, so it may be desirable to make them of some material such as neoprene having negligible expansion with heat but still inert to oil or other fluids apt to be encountered. Preferably the tolerances are quite close or "piston rings" (not shown) or a thick grease or some equivalent means is used so that there will be no gas pressure leakage between slug and tubing thereabout at least up to a pressure of less than one atmosphere (or even several atmospheres). As previously explained, some means must be provided for preventing the blow-out of the slugs with consequent gas leakage under vacuum, while still allowing for the sliding compression during heat cycles, and in Figs. 2-3 plug stop means comprise additional stationary plugs 30 which are firmly fixed in the tube as by crimping the tube at 31 to seize these plugs against movement.

It is to be noted that with the arrangement as shown in Figs. 2-3 the opening 22 is long enough to permit the insertion one-by-one of the two plugs 20 and 30, but that during operation the stationary plug 30 projects far enough over this opening 22 to prevent the blow-out or fall-out of moving slug 20 no matter how far it may try to slide to the right during an evacuation cycle. It is also to be noted that in the arrangement of Figs. 2-3 each stationary slug 30 not only acts as a barrier preventing such drop-out of a slug to its left, but serves as a header against which pressure may be built up by a sliding slug 20 to its right (except at one or the other of the extreme ends of the cable).

In the arrangement illustrated in Fig. 4 there are no stationary slugs at all, for of the slugs 20 are sliding slugs but after they are introduced into the tube, for example through the opening 22, blow-out preventing means are furnished in the form of small pins 41 driven right through the tubes. With this arrangement there are two moving slugs 20 between each pair of openings 22. Of course, the extreme ends of the tube can either be closed off by a solid header or pipe cap, or at an extreme end there may be the same arrangement of pin stopped sliding slug as indicated at the left end of Fig. 4.

If desired the stop means may be in the form of a stationary slug glued in place as indicated at 50 in Fig. 5, and the mating surface of sliding slug 20 may be tapered as indicated at 20a in Fig. 5 in order to provide for introduction of wedging oil pressure to start movement of sliding slug 20 to the left when the moving and stationary slugs are in the fully engaged position as indicated by the dotted outline 20b in Fig. 5.

In the arrangement of Fig. 6 small screws or rivets 60 provide the stop means for movable slugs comprising spherical balls 61 placed on either side of communicating ports 62 which may also serve as ports for introducing the balls into the tube in the first place.

In Fig. 7 I have shown a first tube 70 which may, by way of example, be 30 feet long, spliced to a similar tube 71 by means of a coupling sleeve 72 brazed at its ends to the individual tubes as at 73. Small sliding slugs or plugs 20 are provided. They prevent loss of gas during the evacuation cycle of the cable, as before, and because of the provision of holes 64 (in this case through the sleeve) communication is provided between insulation impregnating fluid and the interior of the sleeve and adjoining tubes, and the slugs allow the compression of gas within the tubes during heat cycles of the cable. The whole idea becomes possible by having "stops" which in the arrangement of Fig. 7 take the form of turned over tangs 75 at the ends of the tubes.

There is thus provided simple and inexpensive means capable of meeting the objects above set forth.

While I am aware that sliding pistons have previously been suggested, as by Thompson, and even a ball check valve as shown in Fig. 6 of my Patent 2,316,808, still the prior arrangements have not been effectual to achieve the desired ends, the arrangement in said patent Fig. 6 having the stop on the wrong side of the slide with respect to the location of the port.

With the present invention, however, the sliding seals are always effective to prevent contact between gas and oil. For while the seals are slidable within lengths of tubing they encounter stops before moving too far in such a direction as would ultimately result in loss of gas pressure and admixture of gas and oil or their equivalents, and this is true regardless of cable inclination during manufacture, or during storage or when installed.

While I have illustrated and described particular embodiments, various modifications may obviously be made without departing from the true spirit and scope of the invention which I intend to define in the appended claims.

I claim:

1. A cable comprising an insulated conductor enclosed in a fluid tight sheath containing a pressure fluid insulating medium, at least one hollow tube within the sheath to provide gas pressure compensating, said hollow tube being provided with at least one opening communicating between the interior of the tube and the space without the tube occupied by the bulk of the pressure fluid insulating medium, means remote from said opening and on at least one side thereof to provide a head against which gas pressure may be built up within the tube, a gas in the tube on the opening side of said remote means, a movable impermeable slug within the tube and on the remote means side of said opening to entrap a portion of said gas between the remote means and said slug, and slug stop means secured with respect to the tube and on the same side of the slug as said opening, with the parts configured and arranged such that the slug acts as a movable seal for the entrapped gas preventing intermixture of entrapped gas and insulating fluid and pressure compensating to the time of hitting the stop and thereafter, when against the stop, the slug forms a seal to prevent loss of pressure from the tube at pressure differences up to about one atmosphere.

2. A cable comprising an insulated conductor enclosed in a fluid tight sheath containing a pressure fluid insulating medium, at least one hollow tube within the sheath to provide gas pressure compensating, said hollow tube being provided intermediate its ends with at least one opening communicating between the interior of the tube and the space without the tube occupied by the bulk of the pressure fluid insulating medium, means remote from said opening and on at least one side thereof to provide a head against which gas pressure may be built up within the tube, a gas in the tube on the opening side of said remote means, a movable greased seal within the tube and on the remote means side of said opening to entrap a portion of said gas between the remote means and said seal, and stop means on the same side of the movable seal as said opening to prevent movable seal overtravel thereby at all times to prevent intermixture of the entrapped gas with the pressure fluid insulating medium, the said remote means comprising an otherwise movable seal held in place within the tube by crimping of the tube.

3. Electric cable comprising the combination of at least one insulated conductor, a liquid impregnant for the insulation of the conductor, an outer sheath impervious to said liquid, a hollow gas containing tube extending generally lengthwise within the sheath and having openings therethrough making the tube not continuous as to pressure transmission for any great length of the cable, slugs slidable within the tube between openings, stop means to prevent overtravel of said slugs adjacent the openings, and pressure sealing means to prevent pressure leakage between each sliding slug and the adjacent portion of the tube.

4. Cable comprising in combination a conductor, insulation about the conductor, a liquid impregnant for the insulation, an outer sheath impervious to said liquid, hollow tubing extending generally lengthwise with the sheath and for pressure compensating, sliding slugs within the tubing for preventing communication between the liquid impregnant and a pressure compensating gas within the tubing, additional slugs within the tubing, crimps in the tubing adjacent each opening and holding stationary one of said additional slugs protruding over a portion of the opening to prevent fall-out of a sliding slug approaching from the opposite side of the opening, and means forming a less than atmospheric pressure seal around each slug with respect to the tubing thereabout.

5. Cable comprising in combination a conductor, insulation about the conductor, a liquid impregnant for the insulation, an outer sheath impervious to said liquid, hollow tubing extending generally lengthwise with the sheath and for pressure compensating, slugs within the tubing for preventing communication between the liquid impregnant and a pressure compensating gas within the tubing, and fastening means for holding every other slug, as encountered along the tubing, with respect to adjacent openings through the tubing wall whereby held slugs may serve individually each as a header for gas pressure as built up within the tubing by a remote sliding slug to one side thereof and as a stop means for a sliding slug to the other side thereof.

References Cited in the file of this patent

UNITED STATES PATENTS

| | | |
|---|---|---|
| 2,138,362 | Thompson | Nov. 29, 1938 |
| 2,316,808 | Peterson | Apr. 20, 1943 |